(12) United States Patent
Kaneko et al.

(10) Patent No.: US 12,109,458 B2
(45) Date of Patent: Oct. 8, 2024

(54) GOLF BALL

(71) Applicant: Sumitomo Rubber Industries, Ltd., Kobe (JP)

(72) Inventors: Takumi Kaneko, Kobe (JP); Takahiro Shigemitsu, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 585 days.

(21) Appl. No.: 17/471,713

(22) Filed: Sep. 10, 2021

(65) Prior Publication Data
US 2022/0080267 A1    Mar. 17, 2022

(30) Foreign Application Priority Data
Sep. 11, 2020    (JP) .................... 2020-152659

(51) Int. Cl.
| | | |
|---|---|---|
| A63B 37/00 | (2006.01) | |
| C08F 283/00 | (2006.01) | |
| C08G 18/04 | (2006.01) | |
| C08G 18/42 | (2006.01) | |
| C08G 18/48 | (2006.01) | |
| C08G 18/66 | (2006.01) | |
| C08G 18/73 | (2006.01) | |
| C08G 18/75 | (2006.01) | |
| C08J 7/056 | (2020.01) | |
| C08J 7/16 | (2006.01) | |
| C08J 7/18 | (2006.01) | |
| C09D 175/04 | (2006.01) | |
| C09D 175/08 | (2006.01) | |
| C08G 18/12 | (2006.01) | |

(52) U.S. Cl.
CPC .. *A63B 37/00221* (2020.08); *A63B 37/00222* (2020.08); *C08F 283/00* (2013.01); *C08G 18/04* (2013.01); *C08G 18/4244* (2013.01); *C08G 18/4854* (2013.01); *C08G 18/6677* (2013.01); *C08G 18/73* (2013.01); *C08G 18/755* (2013.01); *C08J 7/056* (2020.01); *C08J 7/16* (2013.01); *C08J 7/18* (2013.01); *C09D 175/04* (2013.01); *C09D 175/08* (2013.01); *C08G 18/12* (2013.01)

(58) Field of Classification Search
None
See application file for complete search history.

(56) References Cited

U.S. PATENT DOCUMENTS

| | | | | |
|---|---|---|---|---|
| 4,897,433 A | * | 1/1990 | Sugo ................... | A61L 33/0088 427/2.24 |
| 2008/0003442 A1 | * | 1/2008 | Egashira ............. | A63B 37/0023 428/522 |

FOREIGN PATENT DOCUMENTS

| | | |
|---|---|---|
| JP | 2003-20445 A | 1/2003 |
| JP | 2018-33479 A | 3/2018 |
| JP | 2019-98151 A | 6/2019 |

OTHER PUBLICATIONS

Walo; Improvement of Poly(ester-urethane) Surface Properties by RAFT Mediated Grafting Initiated by Gamma Radiation; European Polymer Journal 68 (2015) pp. 398-408. (Year: 2015).*

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having oily stain washability or weed juice stain resistance that is adjustable depending on a temperature. The present invention provides a golf ball comprising a golf ball body and a paint film composed of at least one layer and covering the golf ball body, wherein a molecular chain of a base resin constituting an outermost layer located at an outermost side of the paint film has a graft chain, and 80 mole % or more of repeating units constituting the graft chain includes any one of repeating units represented by formulae (1) to (4):

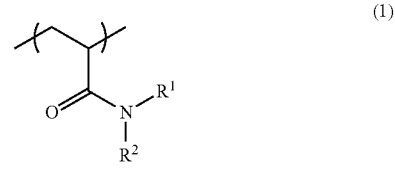

(1)

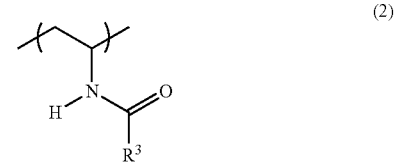

(2)

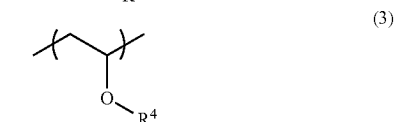

(3)

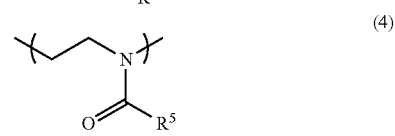

(4)

[In the formulae (1) to (4), $R^1$ to $R^5$ each independently represent hydrogen, halogen or an organic group.].

15 Claims, 1 Drawing Sheet

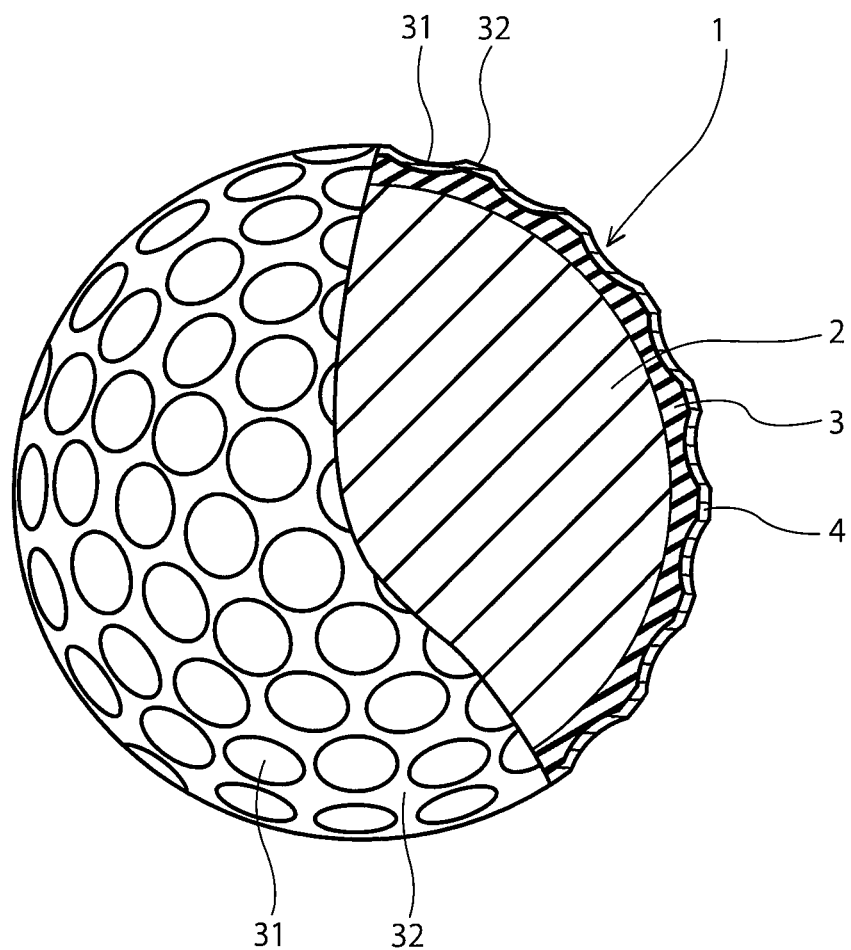

GOLF BALL

FIELD OF THE INVENTION

The present invention relates to a technology for improving stain resistance of a golf ball.

DESCRIPTION OF THE RELATED ART

A paint film is formed on a surface of a golf ball body. It has been proposed to improve stain resistance of a golf ball by improving the paint film thereof.

For example, Japanese Patent Publication No. 2019-98151 A discloses a golf ball comprising a golf ball body and a paint film covering the golf ball body, wherein 10% modulus of the paint film is 75 kgf/cm² or less, storage elastic modulus (E'150) at 150° C. obtained by measuring dynamic viscoelasticity of the paint film is $1.0\times10^7$ Pa or more, an indentation depth of the paint film measured with a nano indenter in a state that the paint film is provided on the golf ball body surface is 1250 nm or more, a diameter of the golf ball ranges from 40 mm to 45 mm, and a compression deformation amount of the golf ball when applying a load from 98 N as an initial load to 1275 N as a final load to the golf ball is 3.0 mm or less.

Japanese Patent Publication No. 2018-33479 A discloses a golf ball comprising a plurality of dimples and lands, wherein the golf ball further comprises a plurality of minute projections formed on a surface of the dimples and/or the lands, and the minute projections have an average pitch Pav of 100 μm or more.

Japanese Patent Publication No. 2003-20445 A discloses a golf ball having a golf ball clear paint applied thereon, wherein the golf ball clear paint contains a graft polymer, and the graft polymer is a comb-shaped polymer in which a stem polymer is composed of acrylic resin and a branch polymer is composed of polyorganosiloxane.

SUMMARY OF THE INVENTION

Conventionally, golf balls having improved stain resistance have been proposed. These golf balls are for decreasing water-based stain, but golf balls decreasing oily stain have not been yet discussed.

The present invention has been made in view of the abovementioned circumstances, and an object of the present invention is to provide a golf ball having oily stain washability and weed juice stain resistance that are adjustable depending on a temperature.

The present invention that has solved the above problems provides a golf ball comprising a golf ball body and a paint film composed of at least one layer and covering the golf ball body, wherein a molecular chain of a base resin constituting an outermost layer located at an outermost side of the paint film has a graft chain, and 80 mole % or more of repeating units constituting the graft chain includes any one of repeating units represented by formulae (1) to (4).

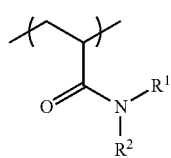

(1)

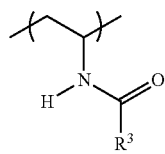

(2)

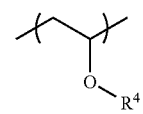

(3)

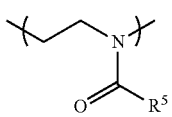

(4)

[In the formulae (1) to (4), $R^1$ to $R^5$ each independently represent hydrogen, halogen or an organic group.]

The golf ball according to the present invention has oily stain washability or weed juice stain resistance that is adjustable depending on a temperature.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a golf ball body and a paint film composed of at least one layer and covering the golf ball body, wherein a molecular chain of a base resin constituting an outermost layer located at an outermost side of the paint film has a graft chain, and 80 mole % or more of repeating units constituting the graft chain includes any one of repeating units represented by formulae (1) to (4).

The graft chain is characterized in that its molecular chain stretches at a low temperature (or high temperature) but its molecular chain aggregates when the temperature is raised (or lowered) to a specific temperature, Thus, the degree of hydrophilicity (or lipophilicity) of the outermost paint film layer having incorporated the graft chain can be controlled based on the state of the graft chain. Therefore, the oily stain washability or weed juice stain resistance at a using temperature or washing temperature of the golf ball according to the present invention can be controlled by suitably selecting the type of the graft chain.

(Outermost Paint Film Layer)

In the present invention, an "outermost layer located at an outermost side of the paint film" is referred to as an "outermost paint film layer." Firstly, the outermost paint film layer will be explained.

The graft chain includes a repeating unit represented by any one of the formulae (1) to (4) which will be described later, as the repeating unit constituting the graft chain. These molecular chains have temperature responsiveness, and change greatly in the affinity to water based on the temperature change. Specifically, these molecular chains have high affinity to water at a low temperature (or high temperature), but show lowered affinity to water when the temperature is raised (or lowered) to a specific temperature. For example, a homopolymer synthesized from a monomer constituting these molecular chains is soluble in water at a low temperature (or high temperature), but becomes insoluble and precipitates when the temperature is raised (or lowered) to a specific temperature (lower (or upper) critical solution temperature).

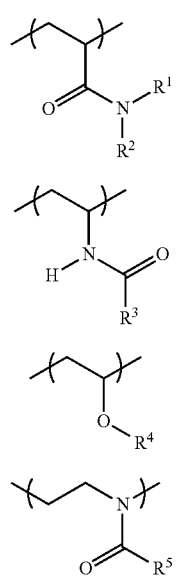

[In the formulae (1) to (4), $R^1$ to $R^5$ each independently represent hydrogen, halogen or an organic group.]

Examples of the halogen represented by $R^1$ to $R^5$ include fluorine, chlorine, bromine, and iodine.

Examples of the organic group represented by $R^1$ to $R^5$ include an alkyl group, an alkenyl group, an alkynyl group, an aryl group, an aralkyl group, a heterocyclyl group, a heterocyclylalkyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a hydroxy group, a hydroxyalkyl group, a carboxy group, an alkylthio group, an arylthio group, an amino group, an aminoalkyl group, a cyano group, a dialkylphosphonate group, a diarylphosphonate group, a dialkylphosphinate group, a diarylphosphinate group, and groups where a part of the hydrogen atom of these organic groups is substituted. The organic group preferably has 18 or less carbon atoms, more preferably has 10 or less carbon atoms, and even more preferably has 5 or less carbon atoms.

The alkyl group includes a linear alkyl group, a branched alkyl group, and a cyclic alkyl group. The alkyl group preferably has 18 or less carbon atoms, more preferably has 10 or less carbon atoms, and even more preferably has 5 or less carbon atoms. Examples of the alkyl group include a methyl group, an ethyl group, a propyl group, an isopropyl group, a butyl group, a t-butyl group, a dodecyl group, a cyclopentyl group, and a cyclohexyl group.

The alkenyl group includes a linear alkenyl group, a branched alkenyl group, and a cyclic alkenyl group. The alkenyl group preferably has 18 or less carbon atoms. Examples of the alkenyl group include a vinyl group, a propenyl group, a butenyl group, and a pentenyl group.

The alkynyl group includes a linear alkynyl group, a branched alkynyl group, and a cyclic alkynyl group. The alkynyl group preferably has 18 or less carbon atoms. Examples of the alkynyl group include an ethynyl group, a propynyl group, a butynyl group, and a pentynyl group.

The aryl group includes a monocyclic aryl group, and a polycyclic aryl group. The aryl group preferably has 20 or less carbon atoms. Examples of the aryl group include a phenyl group, and a naphthyl group.

The aryl group included in the aralkyl group includes a monocyclic aryl group, and a polycyclic aryl group. The aralkyl group preferably has 20 or less carbon atoms. Examples of the aralkyl group include a benzyl group, a phenylethyl group, a phenylpropyl group, a phenylbutyl group, an α-cumyl group, and a 1-phenylethyl group.

The heterocyclyl group is a group removing one hydrogen atom from any ring-forming atom of a heterocyclic compound. The heterocyclic compound is a cyclic compound having a carbon atom and an atom other than the carbon atom as ring-forming atoms, and is preferably a four-membered ring to a seven-membered ring. The atom constituting the heterocyclic compound other than the carbon atom is preferably one member selected from the group consisting of a nitrogen atom, an oxygen atom and a sulfur atom. Examples of the heterocyclyl group include a pyrrolidyl group, a piperidyl group, a pyrrolyl group, a pyridyl group, a tetrahydrofuryl group, a tetrahydropyranyl group, a furyl group, a tetrahydrothienyl group, a tetrahydrothiopyranyl group, a thienyl group, an imidazolidinyl group, an imidazolilyl group, an imidazolyl group, a pyrazolyl group, an oxazolidinyl group, an oxazolyl group, a thiazolidinyl group, a thiazolyl group, a piperazyl group, a morpholyl group, a pyridazinyl group, a pyrimidinyl group, a pyrazinyl group, a quinolyl group, an isoquinolyl group, and a quinazolinyl group. In the heterocyclyl group and the heterocyclylalkyl group, a part of the hydrogen atom of the ring-forming atom of the heterocycle is optionally substituted with an alkyl group.

The alkoxy group preferably has 18 or less carbon atoms. Examples of the alkoxy group include a methoxy group, an ethoxy group, a propoxy group, and a butoxy group.

The aryloxy group preferably has 20 or less carbon atoms. Examples of the aryloxy group include a phenoxy group.

The aralkyloxy group preferably has 20 or less carbon atoms. Examples of the aralkyloxy group include an α-cumyloxy group.

Examples of the heterocyclyloxy group include a pyrrolyloxy group, a pyridyloxy group, and a pyrimidinyloxy group.

The alkanoyl group preferably has 18 or less carbon atoms. Examples of the alkanoyl group include a formyl group, an acetyl group, a propionyl group, and a butyryl group.

The aroyl group preferably has 20 or less carbon atoms. Examples the aroyl group include a benzoyl group and a naphthoyl group.

Examples of the heterocyclylcarbonyl group include a pyrrolylcarbonyl group, a pyridylcarbonyl group, and a pyrimidylcarbonyl group.

The alkoxycarbonyl group preferably has 19 or less carbon atoms. Example of the alkoxycarbonyl group include a methoxycarbonyl group, an ethoxycarbonyl group, and a propoxycarbonyl group.

The aryloxycarbonyl group preferably has 21 or less carbon atoms. Example of the aryloxycarbonyl group include a phenoxycarbonyl group.

Examples of the heterocyclyloxycarbonyl group include a pyrrolyloxycarbonyl group, a pyridyloxycarbonyl group, and a pyrimidinyloxycarbonyl group.

The alkanoyloxy group preferably has 18 or less carbon atoms. Example of the alkanoyloxy group include an acetyloxy group, and a propionyloxy group.

The aroyloxy group preferably has 20 or less carbon atoms. Example of the aroyloxy group include a benzoyloxy group, and a 1-naphthoyl oxy group.

Examples of the heterocyclylcarbonyloxy group include a pyrrolylcarbonyloxy group, a pyridylcarbonyloxy group, and a pyrimidinylcarbonyloxy group.

The hydroxyalkyl group preferably has 18 or less carbon atoms. Examples of the hydroxyalkyl group include a hydroxymethyl group, a hydroxyethyl group, a hydroxypropyl group, and a hydroxybutyl group. In the hydroxyalkyl group, the hydrogen atom of the hydroxy group may be substituted.

The alkylthio group preferably has 18 or less carbon atoms. Examples of the alkylthio group include a methylthio group, an ethylthio group, a propylthio group, and a dodecylthio group.

The arylthio group preferably has 20 or less carbon atoms. Examples of the arylthio group include a phenylthio group.

Examples of the substituent group for substituting a part of the hydrogen atoms of the organic group include an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, an oxo group, a halogen atom, and a super actinoid atom (for example, rutherfordium). In addition, in the case that the organic group includes a nitrogen atom, the nitrogen atom may be quaternized.

The organic group preferably includes the alkyl group having 1 to 18 carbon atoms, the alkanoyl group having 1 to 18 carbon atoms, the aminoalkyl group (amino group may be quaternized) having 1 to 18 carbon atoms, the hydroxyalkyl group (the hydrogen atom of the hydroxy group may be substituted) having 1 to 18 carbon atoms, or the heterocyclylalkyl group (nitrogen atom may be quaternized) having 1 to 20 carbon atoms.

Examples of the repeating unit represented by the formula (1) include those represented by the formulae (1-1) to (1-8).

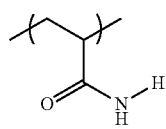

(1-1)

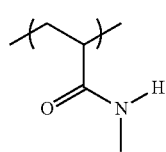

(1-2)

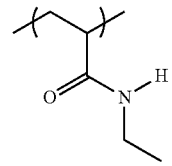

(1-3)

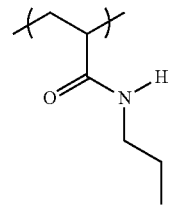

(1-4)

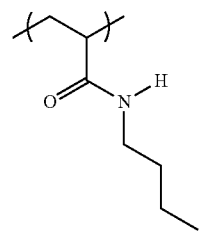

(1-5)

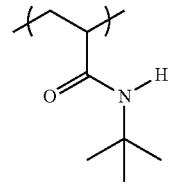

(1-6)

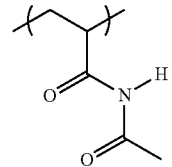

(1-7)

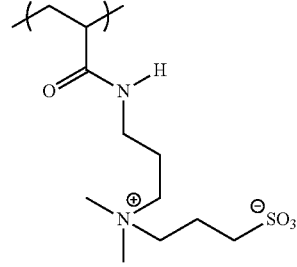

(1-8)

Examples of the repeating unit represented by the formula (2) include those represented by the formulae (2-1) to (2-6).

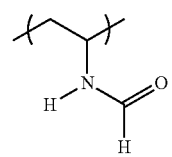

(2-1)

Examples of the repeating unit represented by the formula (3) include those represented by the formulae (3-1) to (3-6).

Examples of the repeating unit represented by the formula (4) include those represented by the formulae (4-1) to (4-3).

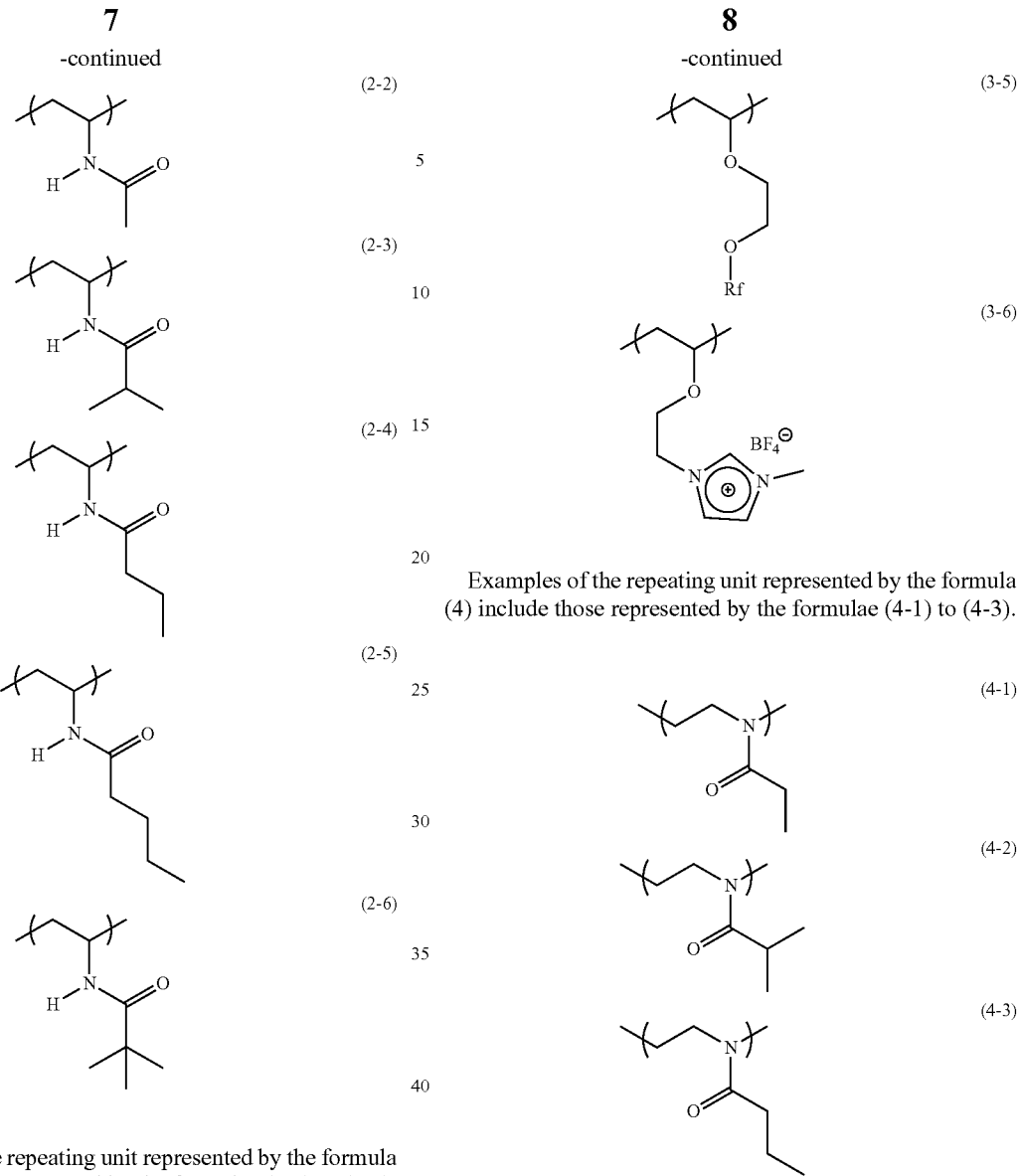
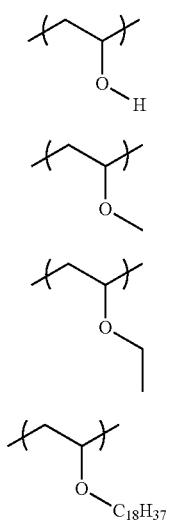

At least 80 mole % of the repeating units constituting the graft chain includes any one of repeating unit selected from the repeating units represented by the formulae (1) to (4). In other words, at least 80 mole % of the repeating units constituting the graft chain includes a molecular chain consisting of any one of the repeating units represented by the formula (1), a molecular chain consisting of any one of the repeating units represented by the formula (2), a molecular chain consisting of any one of the repeating units represented by the formula (3), or a molecular chain consisting of any one of the repeating units represented by the formula (4).

The other repeating unit constituting the graft chain than the repeating units represented by the formulae (1) to (4) is not particularly limited, and can be suitably selected according to the desired cloud point of the graft chain.

The amount of the repeating unit which is the primary component, in the graft chain is preferably 90 mole % or more, more preferably 95 mole % or more. The graft chain preferably consists of one of the repeating units represented by the formulae (1) to (4). In other words, the graft chain is preferably a homopolymer. The graft chain preferably has a lower critical solution temperature. That is, the graft chain is preferably soluble in water at a low temperature but becomes insoluble and precipitates when the temperature is raised to a specific temperature (lower critical solution temperature).

Examples of the molecular chain consisting of one of the repeating units represented by the formula (1) include a polyacrylamide chain, poly(N-methylacrylamide) chain, poly(N-ethylacrylamide) chain, poly(N-n-propylacrylamide) chain, poly(N-isopropylacrylamide) chain, poly(N-n-butylacrylamide) chain, poly(N-t-butylacrylamide) chain, and poly(N-acetylacrylamide) chain.

Examples of the molecular chain consisting of one of the repeating units represented by the formula (2) include a poly(N-vinylformamide) chain, poly(N-vinylacetamide) chain, poly(N-vinylisopropylamide) chain, poly(N-vinyl-n-propylamide) chain, poly(N-vinylbutylamide) chain, and poly(N-vinyl-t-butylamide) chain.

Examples of the molecular chain consisting of one of the repeating units represented by the formula (3) include a polyvinyl alcohol chain, polymethylvinyl ether chain, polyethylvinyl ether chain, and polystearylvinyl ether chain.

Examples of the molecular chain consisting of one of the repeating units represented by the formula (4) include a poly(2-ethyl-2-oxazoline) chain, poly(2-isopropyl-2-oxazoline) chain, and poly(2-n-propyl-2-oxazoline) chain.

Among them, the graft chain is preferably the poly(N-isopropylacrylamide) chain, poly(N-n-propylacrylamide) chain, poly(N-n-butylacrylamide) chain, or poly(N-t-butylacrylamide) chain.

The cloud point of the graft chain is preferably 0° C. or more, more preferably 5° C. or more, and even more preferably 10° C. or more, and is preferably 50° C. or less, more preferably 45° C. or less, and even more preferably 40° C. or less. If the cloud point of the graft chain is 0° C. or more, the graft chain can be synthesized in water, and if the cloud point of the graft chain is 50° C. or less, the stain resistance can be more easily adjusted depending on a temperature.

The cloud point of the graft chain can be obtained by synthesizing a polymer having the same composition as the graft chain and measuring the cloud point of the polymer. In the measurement of the cloud point, an aqueous solution of the synthesized polymer is prepared, the temperature of the aqueous solution is raised (or lowered), and a temperature at which the polymer precipitates out of the aqueous solution and the solution becomes cloudy is adopted as the cloud point. It is noted that the cloud point is the lower critical solution temperature of the polymer in the case that the polymer is soluble in water at a low temperature and precipitates at a temperature of cloud point or higher. On the other hand, the cloud point is the upper critical solution temperature of the polymer in the case that the polymer is soluble in water at a high temperature and precipitates at a temperature of cloud point or lower.

The cloud point (lower critical solution temperature) of various graft chains is listed as follows. The cloud point of poly(N-ethylacrylamide) chain is 73° C. The cloud point of poly(N-n-propylacrylamide) chain is 23° C. The cloud point of poly(N-isopropylacrylamide) chain is 32° C. The cloud point of poly(N-n-butylacrylamide) chain is 0° C. The cloud point of poly(N-t-butylacrylamide) chain is 0° C. The cloud point of poly(N-vinylisopropylamide) chain is 39° C. The cloud point of poly(N-vinyl-n-propylamide) chain is 32° C. The cloud point of polymethylvinyl ether chain is 34° C. The cloud point of poly(2-ethyl-2-oxazoline) chain is 65° C. The cloud point of poly(2-isopropyl-2-oxazoline) chain is 38° C. The cloud point of poly(2-n-propyl-2-oxazoline) chain is 20° C.

The introduction amount of the graft chain is preferably 0.001 g or more, more preferably 0.005 g or more, and even more preferably 0.01 g or more, and is preferably 2 g or less, more preferably 1.5 g or less, and even more preferably 1 g or less, per golf ball. If the introduction amount of the graft chain is 0.001 g or more, the stain resistance is better, and if the introduction amount of the graft chain is 2 g or less, the golf ball satisfies the weight regulation.

(Base Resin)

Examples of the base resin constituting the paint film include a urethane resin, an ionomer resin, an epoxy resin, an acrylic resin, a vinyl acetate resin, and a polyester resin. Among them, the urethane resin is preferable. The base resin preferably has a three-dimensional network structure. If the base resin constituting the paint film is the urethane resin, properties of the paint film can be controlled by adjusting the composition of the polyol composition or polyisocyanate composition, or their mixing ratio. It is noted that in the case that the paint film is multiple layered, the resins constituting the layers may be different from each other, but the base resins constituting the layers are all preferably the urethane resin.

(Polyurethane Paint)

The paint film is preferably formed from a paint containing a polyol composition and a polyisocyanate composition. Examples of the paint include a so-called two-component curing type urethane paint including a polyol as a base agent and a polyisocyanate as a curing agent.

(Polyol Composition)

The polyol composition contains a polyol compound. Examples of the polyol compound include a compound having two or more hydroxy groups in the molecule. Examples of the polyol compound include a compound having a hydroxy group at a terminal of the molecule, and a compound having a hydroxy group at a position other than the terminal of the molecule. The polyol compound may be used solely, and two or more of the polyol compounds may be used in combination.

Examples of the compound having the hydroxy group at the terminal of the molecule include a low molecular weight polyol having a molecular weight less than 500, and a high molecular weight polyol having a number average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol, polyester polyol, polycaprolactone polyol, polycarbonate polyol, urethane polyol, and acrylic polyol. Examples of the polyether polyol include polyoxyethylene glycol (PEG), polyoxypropylene glycol (PPG), and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

The urethane polyol is a compound having a plurality of urethane bonds in its molecule, and having two or more hydroxy groups in one molecule thereof. Examples of the urethane polyol include a urethane prepolymer obtained by a reaction between a first polyol component and a first polyisocyanate component under a condition that the amount of the hydroxy group included in the first polyol component is excessive to the amount of the isocyanate group included in the first polyisocyanate component.

Examples of the first polyol component constituting the urethane polyol include a polyether diol, polyester diol, polycaprolactone diol, and polycarbonate diol, and the polyether diol is preferable. Examples of the polyether diol include polyoxyethylene glycol, polyoxypropylene glycol, and polyoxytetramethylene glycol. Among them, polyoxytetramethylene glycol is preferable.

The number average molecular weight of the polyether diol is preferably 500 or more, more preferably 600 or more, and is preferably 4,000 or less, more preferably 3,500 or less, and even more preferably 3,000 or less. If the number average molecular weight of the polyether diol is 500 or more, the distance between crosslinking points in the paint film becomes long and the paint film becomes soft, thus the spin performance is enhanced. If the number average molecular weight of the polyether diol is 4,000 or less, the distance between crosslinking points in the paint film does not become excessively long, thus the stain resistance of the paint film becomes better. It is noted that the number average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

The first polyol component may include a low molecular weight polyol having a molecular weight of less than 500. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. The low molecular weight polyol may be used solely or as a mixture of at least two of them.

The urethane polyol preferably includes the triol component and the diol component as the first polyol component. As the triol component, trimethylolpropane is preferable. The mixing ratio of the triol component to the diol component (triol component/diol component) is preferably 0.2 or more, more preferably 0.5 or more, and is preferably 6.0 or less, more preferably 5.0 or less, in a mass ratio.

The first polyisocyanate component constituting the urethane polyol is not particularly limited, as long as the polyisocyanate component has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI). These polyisocyanates may be used solely or as a mixture of at least two of them.

The amount of the polyether diol in the urethane polyol is preferably 70 mass % or more, more preferably 72 mass % or more, and even more preferably 75 mass % or more. The polyether diol forms a soft segment in the paint film. Therefore, if the amount of the polyether diol is 70 mass % or more, the obtained golf ball has further enhanced spin performance.

The weight average molecular weight of the urethane polyol is preferably 5,000 or more, more preferably 5,300 or more, and even more preferably 5,500 or more, and is preferably 20,000 or less, more preferably 18,000 or less, and even more preferably 16,000 or less. If the weight average molecular weight of the urethane polyol is 5,000 or more, the distance between crosslinking points in the paint film becomes long and the paint film becomes soft, thus the spin performance is enhanced. If the weight average molecular weight is 20,000 or less, the distance between crosslinking points in the paint film does not become excessively long, thus the stain resistance of the paint film becomes better.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less. The hydroxyl value can be measured according to JIS K 1557-1, for example, by an acetylation method.

Examples of the compound having the hydroxy group at the position other than the terminal of the molecule include a modified polyrotaxane having a hydroxy group, and a hydroxy group modified vinyl chloride-vinyl acetate copolymer.

The modified polyrotaxane having the hydroxy group has a cyclodextrin, a linear molecule piercing through the cyclic structure of the cyclodextrin, and blocking groups located at both terminals of the linear molecule to prevent disassociation of the cyclic molecule of the cyclodextrin. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect. Thus, the polyrotaxane has an excellent property that a crack or flaw very hardly occurs, unlike a conventional crosslinked polymer.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is movable along and rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has a functional group at both terminals thereof. When the linear molecule has the functional group, the linear molecule can easily react with the blocking group. Examples of the functional group include a hydroxyl group, a carboxyl group, an amino group, and a thiol group.

The blocking group is not particularly limited, as long as it is located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins which the linear molecule pierces through preferably ranges from 0.06 to 0.61, more preferably ranges from 0.11 to 0.48, even more preferably ranges from 0.24 to 0.41, if the maximum number of the cyclodextrins which the linear molecule pierces through is deemed as 1. This is because if the number of the cyclodextrins is less than 0.06, the pulley effect may not be exerted, and if the number of the cyclodextrins exceeds 0.61, the cyclodextrins are very densely located, so that the movability of the cyclodextrin may decrease.

The polyrotaxane is preferably a polyrotaxane having at least a part of hydroxyl groups of the cyclodextrin being modified with a caprolactone chain. Modifying with the caprolactone chain alleviates the steric hindrance between the polyrotaxane and the polyisocyanate, and thus enhances the reaction efficiency with the polyisocyanate.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain—(CO(CH$_2$)$_5$O)nH (n is a natural number ranging from 1 to 100) is linked to the exterior side of the cyclic structure of the cyclodextrin via —O—C$_3$H$_6$—O— group. The above "n" represents the degree of polymerization, and is preferably a natural number ranging from 1 to 100, more preferably a natural number ranging from 2 to 70, even more preferably a natural number ranging from 3 to 40. At another terminal of the caprolactone chain, a hydroxyl group is formed through the ring-opening polymerization. The terminal hydroxyl group of the caprolactone chain can react with the polyisocyanate.

The ratio of the hydroxyl groups modified with the caprolactone chain to all the hydroxyl groups (100 mole %) included in the cyclodextrin before the modification is preferably 2 mole % or more, more preferably 5 mole % or more, even more preferably 10 mole % or more. If the ratio of the hydroxyl groups modified with the caprolactone chain falls within the above range, the polyrotaxane has greater hydrophobicity and thus has a higher reactivity with the polyisocyanate.

The hydroxyl value of the polyrotaxane is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 220 mg KOH/g or less, particularly preferably 180 mg KOH/g or less. If the hydroxyl value of the polyrotaxane falls within the above range, the polyrotaxane has a higher reactivity with the polyisocyanate, and thus the paint film has better durability.

The total molecular weight of the polyrotaxane is preferably 30,000 or more, more preferably 40,000 or more, even more preferably 50,000 or more, and is preferably 3,000,000 or less, more preferably 2,500,000 or less, even more preferably 2,000,000 or less, in a weight average molecular weight. If the total weight average molecular weight is 30,000 or more, the paint film has sufficient strength, and if the total weight average molecular weight is 3,000,000 or less, the paint film has sufficient flexibility and thus the golf ball has enhanced approach performance. It is noted that the total weight average molecular weight of the polyrotaxane may be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

Specific examples of the polyrotaxane modified with the polycaprolactone chain include SeRM super polymer SH3400P, SH2400P, and SH1310P available from Advanced Softmaterials Inc.

The hydroxy group modified vinyl chloride-vinyl acetate copolymer can adjust the tackiness of the paint film while maintaining the scuff resistance of the paint film. The hydroxy group modified vinyl chloride-vinyl acetate copolymer can be obtained, for example, by a method of copolymerizing vinyl chloride, vinyl acetate, and a monomer having a hydroxy group (e.g., polyvinyl alcohol, hydroxyalkyl acrylate); and a method of partially or completely saponifying a vinyl chloride-vinyl acetate copolymer.

The amount of the vinyl chloride component in the hydroxy group modified vinyl chloride-vinyl acetate copolymer is preferably 1 mass % or more, more preferably 20 mass % or more, and even more preferably 50 mass % or more, and is preferably 99 mass % or less, more preferably 95 mass % or less. Specific examples of the hydroxy group modified vinyl chloride-vinyl acetate copolymer include Solbin (registered trademark) A, Solbin AL, and Solbin TA3 available from Nissin Chemical Industry Co., Ltd.

Preferable examples of the polyol composition include an embodiment (a first embodiment) containing the urethane polyol which includes the polyether diol having a number average molecular weight ranging from 600 to 3000 as a constituent component; and an embodiment (a second embodiment) containing the polyrotaxane having the cyclodextrin, the linear molecule piercing through the cyclic structure of the cyclodextrin, and the blocking groups located at both terminals of the linear molecule to prevent disassociation of the cyclodextrin, wherein at least a part of hydroxyl groups of the cyclodextrin is modified with a caprolactone chain via a —O—C$_3$H$_6$—O— group.

The amount of the urethane polyol in the polyol component of the polyol composition of the first embodiment is preferably 60 mass % or more, more preferably 70 mass % or more, and even more preferably 80 mass % or more. It is also preferable that the polyol component contained in the polyol composition of the first embodiment consists of the urethane polyol.

The amount of the polyrotaxane in the polyol component of the polyol composition of the second embodiment is preferably 10 mass % or more, more preferably 15 mass % or more, and even more preferably 20 mass % or more, and is preferably 100 mass % or less, more preferably 90 mass % or less, and even more preferably 85 mass % or less.

The polyol composition of the second embodiment preferably contains the polycaprolactone polyol. The mass ratio (polycaprolactone polyol/polyrotaxane) of the polycaprolactone polyol to the polyrotaxane is preferably 0/100 or more, more preferably 5/95 or more, and even more preferably 10/90 or more, and is preferably 90/10 or less, more preferably 85/15 or less, and even more preferably 80/20 or less.

The polyol composition of the second embodiment preferably contains the hydroxy group modified vinyl chloride-vinyl acetate copolymer. The amount of the hydroxy group modified vinyl chloride-vinyl acetate copolymer in the polyol component of the polyol composition is preferably 4 mass % or more, more preferably 8 mass % or more, and is preferably 50 mass % or less, more preferably 45 mass % or less.

(Polyisocyanate Composition)

Next, the polyisocyanate composition will be explained. The polyisocyanate composition contains a polyisocyanate compound. Examples of the polyisocyanate compound include compounds having two or more isocyanate groups.

Examples of the polyisocyanate compound include an aromatic diisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI, xylylene diisocyanate (XDI), tetramethylxylylenediisocyanate (TMXDI), and para-phenylene diisocyanate (PPDI); an alicyclic diisocyanate or aliphatic diisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI); and a triisocyanate such as an allophanate-modified product, biuret-modified product, isocyanurate-modified product or adduct-modified product of these diisocyanates. These polyisocyanates may be used solely, or two or more of the polyisocyanates may be used in combination.

The allophanate-modified product is, for example, a triisocyanate obtained by further reacting a diisocyanate with a urethane bond formed through a reaction between a diisocyanate and a low molecular weight diol. The adduct product is a triisocyanate obtained through a reaction between a diisocyanate and a low molecular weight triol such as trimethylolpropane or glycerin. The biuret-modified product is, for example, a triisocyanate having a biuret bond represented by the following chemical formula (11). The isocyanurate-modified product of diisocyanate is, for example, a triisocyanate represented by the following chemical formula (12).

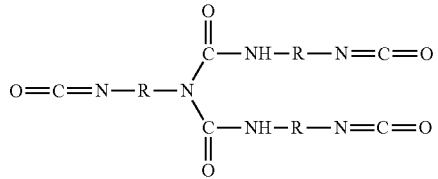

(11)

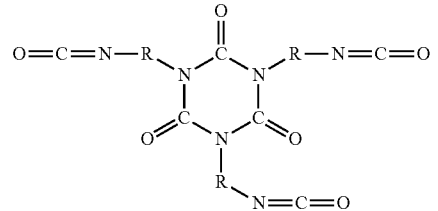

(12)

In the chemical formulae (11) and (12), R represents a residue where isocyanate groups are removed from the diisocyanate.

Preferable examples of the triisocyanate include isocyanurate-modified product of hexamethylene diisocyanate, biuret-modified product of hexamethylene diisocyanate, and isocyanurate-modified product of isophorone diisocyanate.

In the present invention, the polyisocyanate composition preferably contains the triisocyanate compound. The amount of the triisocyanate compound in the polyisocyanate contained in the polyisocyanate composition is preferably 50 mass % or more, more preferably 60 mass % or more, and even more preferably 70 mass % or more. It is most preferable that the polyisocyanate component in the polyisocyanate composition consists of the triisocyanate compound.

The amount (NCO %) of the isocyanate group of the polyisocyanate contained in the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the amount (NCO %) of the isocyanate group of the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 available from DIC corporation; Desmodur N75MPA/X, Desmodur N3300, Desmodur L75 (C), and Sumidur E21-1 available from Sumika Bayer Urethane Co., Ltd.; Coronate HX, and Coronate HK available from Japan Polyurethane Industry Co. Ltd.; Duranate 24A-100, Duranate 21S-75E, Duranate TPA-100, and Duranate TKA-100 available from Asahi Kasei Chemicals Corporation; and VESTANAT T1890 available from Degussa Co., Ltd.

In the curing reaction of the curing type paint composition, the molar ratio (NCO group/OH group) of the isocyanate group (NCO group) included in the curing agent to the hydroxyl group (OH group) included in the base agent is preferably 0.1 or more, more preferably 0.2 or more. If the molar ratio (NCO group/OH group) is less than 0.1, the curing reaction is not sufficient, and if the molar ratio (NCO group/OH group) is excessively great, the amount of the isocyanate group becomes excessive, and thus the obtained paint film may become hard and fragile, and the appearance thereof may deteriorate. For this reason, the molar ratio (NCO group/OH group) is preferably 1.5 or less, more preferably 1.4 or less, and even more preferably 1.3 or less. It is noted that the reason why the appearance of the obtained paint film deteriorates if the amount of the isocyanate group is excessive in the paint is considered that an excessive amount of the isocyanate group may promote a reaction between the moisture in the air and the isocyanate group, thereby generating a lot of carbon dioxide gas.

In the case that the polyol composition of the first embodiment is used as the polyol composition, the polyisocyanate composition preferably contains the biuret-modified product of hexamethylene diisocyanate, the isocyanurate-modified product of hexamethylene diisocyanate and the isocyanurate-modified product of isophorone diisocyanate. In the case that the biuret-modified product of hexamethylene diisocyanate and the isocyanurate-modified product of hexamethylene diisocyanate are used in combination, their mixing ratio (biuret-modified product/isocyanurate-modified product) preferably ranges from 20/40 to 40/20, more preferably ranges from 25/35 to 35/25 in a mass ratio.

In the case that the polyol composition of the second embodiment is used as the polyol composition, the polyisocyanate composition preferably contains the isocyanurate-modified product of hexamethylene diisocyanate and/or the biuret-modified product of hexamethylene diisocyanate.

The paint may be either a waterborne paint mainly containing water as a dispersion medium or a solvent-based paint containing an organic solvent as a dispersion medium, and the solvent-based paint is preferable. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate. It is noted that the solvent may be blended in either the polyol composition or the polyisocyanate composition. From the viewpoint of uniformly performing the curing reaction, the solvent is preferably blended in each of the polyol composition and the polyisocyanate composition.

A conventionally known catalyst can be employed in the curing reaction. Examples of the catalyst include a monoamine such as triethyl amine and N,N-dimethylcyclohexylamine; a polyamine such as N, N, N', N'-tetramethylethylene diamine and N,N,N',N", N"-pentamethyldiethylene triamine; a cyclic diamine such as 1,8-diazabicyclo[5.4.0]-7-undecene (DBU) and triethylene diamine; a tin catalyst such as dibutyl tin dilaurate and dibutyl tin diacetate. These catalysts may be used solely, or two or more of the catalysts may be used in combination. Among them, the tin catalyst such as dibutyl tin dilaurate and dibutyl tin diacetate is preferable, dibutyl tin dilaurate is particularly preferable.

The paint film may further include additives that can be generally included in a paint for a golf ball, such as an ultraviolet absorber, an antioxidant, a light stabilizer, a fluorescent brightener, an anti-blocking agent, a leveling agent, a slip agent, and a viscosity modifier, where necessary.

(Properties of Outermost Paint Film Layer)

The thickness of the outermost paint film layer is preferable 5 μm or more, more preferably 7 μm or more, and even more preferably 9 μm or more, and is preferably 50 μm or less, more preferably 45 μm or less, and even more preferably 40 μm or less. If the thickness falls within the above range, the graft chain is easily introduced to the base resin constituting the outermost paint film layer.

The water contact angle of the surface of the outermost paint film layer at a temperature lower than the cloud point (lower critical solution temperature) of the graft chain is preferably 50° or less, more preferably 45° or less, and even more preferably 40° or less. If the water contact angle at the temperature lower than the cloud point (lower critical solution temperature) of the graft chain is 50° or less, the oily stain is easily washed away with water at a temperature of the cloud point or lower. The water contact angle can be controlled by adjusting types of the base resin or types of the graft chain.

(Paint Film)

The paint film may have a single layered construction, or have a multiple layered construction including at least two layers. In the case that the paint film is single layered, the molecular chain of the base resin constituting the single layered paint film has the graft chain. In the case that the paint film is multiple layered, at least the molecular chain of the base resin constituting the outermost paint film layer located at the outermost layer has the graft chain.

Examples of the base resin constituting the paint film layer other than the outermost paint film layer include a urethane resin, an ionomer resin, an epoxy resin, an acrylic resin, a vinyl acetate resin, and a polyester resin. It is noted that in the case that the paint film is multiple layered, the resins constituting the layers may be different from each other, but the base resins constituting the layers are all preferably the urethane resin.

The total thickness of the paint film is preferably 7 μm or more, more preferably 9 μm or more, and even more preferably 10 μm or more, and is preferably 70 μm or less, more preferably 60 μm or less, and even more preferably 55 μm or less. If the total thickness is 7 μm or more, the oily stain is more easily washed away with water at a temperature of the cloud point or lower. If the thickness is 70 μm or less, the spin rate on driver shots can be suppressed.

(Golf Ball)

The golf ball according to the present invention is not particularly limited, as long as the golf ball comprises a golf ball body and a paint film formed on a surface of the golf ball body. The construction of the golf ball body is not particularly limited, and the golf ball body may be a one-piece golf ball, a two-piece golf ball, a multi-piece golf ball such as a three-piece golf ball, a four-piece golf ball, a five-piece golf ball and a golf ball comprising more than five pieces, or a wound golf ball. The present invention can be applied appropriately to any one of the above golf balls.

(Core)

The one-piece golf ball body, and the core used in a wound golf ball, two-piece golf ball and multi-piece golf ball will be explained.

The one-piece golf ball body and core can be formed from a conventional rubber composition (hereinafter sometimes simply referred to as "core rubber composition"). For example, the one-piece golf ball body and core can be molded by heat pressing a rubber composition containing a base rubber, a co-crosslinking agent and a crosslinking initiator.

As the base rubber, particularly preferred is a high-cis polybutadiene having a cis bond in an amount of 40 mass % or more, preferably 70 mass % or more, and more preferably 90 mass % or more in view of its superior resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. In a case that the α,β-unsaturated carboxylic acid having 3 to 8 carbon atoms is used as the co-crosslinking agent, a metal compound (e.g. magnesium oxide) is preferably added. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, diphenyl disulfides (e.g. diphenyl disulfide, bis (pentabromophenyl) disulfide), thiophenols or thionaphthols (e.g. 2-thionaphthol) are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. As the carboxylic acid, any one of an aliphatic carboxylic acid and an aromatic carboxylic acid (such as benzoic acid) may be used. The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like in addition to the base rubber, the co-crosslinking agent, the crosslinking initiator, and the organic sulfur compound. The molding conditions for heat pressing the core rubber composition may be determined appropriately depending on the rubber composition. Generally, the heat pressing is preferably carried out at a temperature in a range from 130° C. to 200° C. for 10 to 60 minutes, or carried out in a two-step heating of heating at a temperature in a range from 130° C. to 150° C. for 20 to 40 minutes followed by heating at a temperature in a range from 160° C. to 180° C. for 5 to 15 minutes.

(Cover)

The golf ball body preferably comprises the core and a cover covering the core. The cover is formed from a cover composition containing a resin component. The resin component constituting the cover is not particularly limited, and examples thereof include an ionomer resin; various resins such as a polyester resin, urethane resin and polyamide resin; a thermoplastic polyamide elastomer having a trade name of "Pebax (registered trademark) (e.g. "Pebax 2533")" available from Arkema K. K.; a thermoplastic polyester elastomer having a trade name of "Hytrel (registered trademark) (e.g. "Hytrel 3548", "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic styrene elastomer having a trade name of "TEFABLOC (registered trademark)" or a thermoplastic polyester elastomer having a trade name of "Primalloy" available from Mitsubishi Chemical Corporation. These cover materials may be used solely, or two or more of these cover materials may be used in combination.

Among them, the resin component constituting the cover is preferably the polyurethane resin or ionomer resin, more preferably the polyurethane resin. In the case that the resin component constituting the cover includes the polyurethane resin, the amount of the polyurethane resin in the resin component is preferably 50 mass % or more, more preferably 70 mass % or more, and even more preferably 90 mass % or more. In the case that the resin component constituting the cover includes the ionomer resin, the amount of the ionomer resin in the resin component is preferably 50 mass % or more, more preferably 70 mass % or more, and even more preferably 90 mass % or more.

The polyurethane may be either a thermoplastic polyurethane or a thermosetting polyurethane. The thermoplastic polyurethane is a polyurethane exhibiting plasticity by heating and generally means a polyurethane having a linear chain structure of a high molecular weight to a certain extent. On the other hand, thermosetting polyurethane (two-component curing type polyurethane) is a polyurethane obtained by polymerization through a reaction between a low molecular weight urethane prepolymer and a curing agent (chain extender) when molding the cover. The thermosetting polyurethane includes a polyurethane having a linear chain structure, or a polyurethane having a three-dimensional crosslinked structure depending on the number of the functional group of the prepolymer or curing agent (chain extender) to be used. The polyurethane is preferably thermoplastic elastomer.

In addition to the resin component, the cover composition may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or fluorescent brightener, as long as they do not impair the performance of the cover.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and even more preferably 60 or more in shore D hardness, and preferably has a slab hardness of 80 or less, more preferably 70 or less, and even more more preferably 68 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more, and even more preferably 30 or more in shore D hardness. If the cover composition has a slab hardness of less than 50 in Shore D hardness, the obtained golf ball readily stops on the green due to the high spin rate on approach shots. In addition, if the cover composition has a slab hardness of 20 or more in Shore D hardness, the abrasion resistance is enhanced. In case of a plurality of cover layers, the slab hardness of the cover composition constituting each layer may be identical or different, as long as the slab hardness falls within the above range.

The method for molding the cover from the cover composition is not particularly limited, and examples thereof include a method of injection molding the cover composition directly onto the core; and a method of molding the cover composition into hollow shells, covering the core with a plurality of the hollow shells and compression molding the core with a plurality of the hollow shells (preferably a method of molding the cover composition into half hollow-shells, covering the core with two of the half hollow-shells and compression molding the core with two of the half hollow-shells). The golf ball body having the cover formed thereon is ejected from the mold, and as necessary, the golf ball body is preferably subjected to surface treatments such as deburring, cleaning, and sandblast. In addition, if desired, a mark may also be formed thereon.

The total number of the dimples formed on the cover is preferably 200 or more and 500 or less. If the total number of the dimples is less than 200, the dimple effect is hardly obtained, and if the total number of the dimples exceeds 500, the dimple effect is hardly obtained because the size of the respective dimples is small. The shape (shape in a plan view) of the dimples includes, for example, but is not limited to, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination.

The thickness of the cover is preferably 0.1 mm or more, more preferably 0.2 mm or more, and even more preferably 0.3 mm or more, and is preferably 3.0 mm or less, more preferably 2.5 mm or less, and even more preferably 2.0 mm or less. If the thickness of the cover is 0.1 mm or more, the golf ball has better shot feeling, and if the thickness of the cover is 3.0 mm or less, the resilience of the golf ball can be maintained.

In the case that the golf ball is a three-piece golf ball, a four-piece golf ball, or a multi-piece golf ball comprising five or more pieces, examples of the material used for the intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further contain a weight adjusting agent such as barium sulfate and tungsten, an antioxidant, and a pigment. It is noted that the intermediate layer may be referred to as an inner cover layer or an outer core depending on the construction of the golf ball.

The golf ball preferably has a diameter in a range of from 40 mm to 45 mm. In light of satisfying the regulation of US Golf Association (USGA), the diameter is preferably 42.67 mm or more. In light of prevention of air resistance, the diameter is preferably 44 mm or less, more preferably 42.80 mm or less. The golf ball preferably has a mass of 40 g or more and 50 g or less. In light of obtaining greater inertia, the mass is preferably 44 g or more, more preferably 45.00 g or more. In light of satisfying the regulation of USGA, the mass is preferably 45.93 g or less.

When the golf ball has the diameter in the range from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball is not excessively hard and thus the shot feeling thereof is better. On the other hand, if the compression deformation amount is 4.0 mm or less, the resilience is greater.

The FIGURE is a partially cutaway cross-sectional view of a golf ball 1 according to one embodiment of the present invention. The golf ball 1 comprises a spherical core 2, a cover 3 covering the spherical core 2, and a paint film 4 formed on a surface of the cover 3. A plurality of dimples 31 are formed on the surface of the cover 3. Other portions than the dimples 31 on the surface of the cover 3 are lands 32. The paint film 4 is single layered. The molecular chain of the base resin constituting the paint film 4 has incorporated the graft chain.

(Production Method of Golf Ball)

One example of the method for producing the golf ball according to the present invention will be explained. The method for producing the golf ball according to the present invention preferably includes: a first step for producing a golf ball body; a second step for forming a base resin layer on the surface of the golf ball body; a third step for providing the base resin layer with a photopolymerization initiator; and a fourth step for immersing the golf ball body provided with the photopolymerization initiator in a monomer-containing liquid containing at least one monomer represented by the formulae (5) to (8), and irradiating the golf ball body with ultraviolet ray.

(First Step)

In the first step, the golf ball body is produced. The method for producing the golf ball body is not particularly limited, and a conventional method can be suitably adopted according to the construction of the golf ball body.

(Second Step)

In the second step, the base resin layer constituting the paint film is formed on the surface of the golf ball body. The base resin layer can be formed by applying the paint containing the base resin. The method for applying the paint is not particularly limited, a conventional method can be adopted, and examples thereof include a spray coating and electrostatic coating.

For example, in the case of performing the spray coating with an air gun, the polyol composition and the polyisocyanate composition are fed with respective pumps and continuously mixed with a line mixer located in the stream line just before the air gun, and the obtained mixture is air-sprayed. Alternatively, the polyisocyanate composition and the polyol composition are air-sprayed respectively with an air spray system provided with a device for controlling the mixing ratio thereof. The paint application may be conducted by spraying the paint one time or overspraying the paint multiple times.

The paint film (base resin layer) can be formed by drying the paint applied to the golf ball body, for example, at a temperature ranging from 30° C. to 70° C. for 1 hour to 24 hours.

(Third Step)

In the third step, the base resin layer is provided with the photopolymerization initiator. The photopolymerization initiator can be provided by immersing the golf ball body having the base resin layer formed thereon in an initiator solution. Examples of the photopolymerization initiator include benzophenone, and thioxanthone. Examples of the solvent of the initiator solution include ketones such as acetone, esters such as ethyl acetate, ethers such as tetrahydrofuran, and amides such as dimethylformamide.

The concentration of the initiator in the initiator solution is preferably 0.1 mass % or more, more preferably 0.5 mass % or more, and even more preferably 1 mass % or more, and is preferably 50 mass % or less, more preferably 40 mass % or less, and even more preferably 30 mass % or less.

The time for immersing the golf ball body in the initiator solution is preferably 0.5 minute or more, more preferably 1 minute or more, and even more preferably 2 minutes or more, and is preferably 180 minutes or less, more preferably 120 minutes or less, and even more preferably 60 minutes or less. In addition, the temperature of the initiator solution for immersing the golf ball body is preferably 0° C. or more, more preferably 5° C. or more, and even more preferably 10° C. or more, and is preferably 55° C. or less, more preferably 50° C. or less, and even more preferably 45° C. or less.

The golf ball body immersed for a predetermined time is taken out from the initiator solution and dried. The drying method is not particularly limited, and the golf ball body can be allowed to stand still to be dried.

(Fourth Step)

In the fourth step, the golf ball body is immersed in the monomer-containing liquid, and irradiated with ultraviolet ray. By the ultraviolet ray irradiation, the monomer is grafted to the molecular chain of the base resin and polymerized to form the graft chain.

The monomer-containing liquid contains at least one member selected from the monomers represented by the formulae (5) to (8). Further, 80 mole % or more (preferably 90 mole % or more, and more preferably 95 mole % or more) of the monomer contained in the monomer-containing liquid is one monomer selected from the monomers represented by the formulae (5) to (8). In addition, the monomer-containing liquid preferably contains only one monomer.

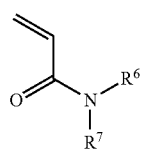

(5)

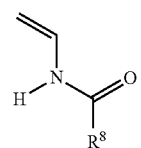

(6)

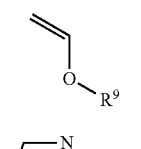

(7)

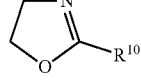

(8)

[$R^6$ to $R^{10}$ in the formulae (5) to (8) each independently represent a hydrogen atom, a halogen atom or an organic group.]

$R^6$ to $R^{10}$ in the formulae (5) to (8) each have the same meaning as $R^1$ to $R^5$ in the formulae (1) to (4).

The organic group represented by $R^6$ to $R^{10}$ preferably includes the alkyl group having 1 to 18 carbon atoms, the alkanoyl group having 1 to 18 carbon atoms, the aminoalkyl group (amino group may be quaternized) having 1 to 18 carbon atoms, the hydroxyalkyl group (the hydrogen atom of the hydroxy group may be substituted) having 1 to 18 carbon atoms, or the heterocyclylalkyl group (nitrogen atom may be quaternized) having 1 to 20 carbon atoms.

Examples of the monomer represented by the formula (5) include acrylamide, N-methylacrylamide, N-ethylacrylamide, N-n-propylacrylamide, N-isopropylacrylamide, N-n-butylacrylamide, N-t-butylacrylamide, and N-acetylacrylamide.

Examples of the monomer represented by the formula (6) include N-vinylformamide, N-vinylacetamide, N-vinylisopropylamide, N-vinyl-n-propylamide, N-vinylbutylamide, and N-vinyl-t-butylamide.

Examples of the monomer represented by the formula (7) include vinyl alcohol, methylvinyl ether, ethylvinyl ether, and stearylvinyl ether.

Examples of the monomer represented by the formula (8) include 2-ethyl-2-oxazoline, 2-isopropyl-2-oxazoline, and 2-n-propyl-2-oxazoline.

The concentration of the monomer in the monomer-containing liquid is preferably 0.01 mol/L or more, more preferably 0.02 mol/L or more, and even more preferably 0.03 mol/L or more, and is preferably 20 mol/L or less, more preferably 15 mol/L or less, and even more preferably 10 mol/L or less.

The irradiation condition of ultraviolet ray is not particularly limited, and can be suitably adjusted as long as the irradiation condition allows the graft polymerization to occur. The irradiation of ultraviolet ray is preferably conducted, for example, at an ultraviolet ray illuminance ranging from 1 mW/cm$^2$ to 30 mW/cm$^2$ for an irradiation time ranging from 1 minute to 600 minutes. After the polymerization, the golf ball taken out from the monomer-containing liquid is preferably washed with water in order to remove the unreacted monomer adhered thereon.

EXAMPLES

Next, the present invention will be described in detail by way of examples. However, the present invention is not limited to the examples described below. Various changes and modifications without departing from the spirit of the present invention are included in the scope of the present invention.

[Production of Golf Ball Body]

1. Production of Spherical Core

The rubber composition having the formulation shown in Table 1 was kneaded and heat-pressed in upper and lower molds, each having a hemispherical cavity, at 150° C. for 19 minutes to obtain the spherical core having a diameter of 39.7 mm. It is noted that the amount of barium sulfate was adjusted such that the ball had a mass of 45.6 g.

TABLE 1

| Core composition | | |
|---|---|---|
| Formulation (parts by mass) | Polybutadiene rubber | 100 |
| | Zinc acrylate | 35 |
| | Zinc oxide | 5 |
| | Barium sulfate | Appropriate amount |
| | Diphenyl disulfide | 0.5 |
| | Dicumyl peroxide | 0.9 |

Polybutadiene rubber: "BR730 (high cis-polybutadiene)" available from JSR Corporation
Zinc acrylate: "ZN-DA90S" available from Nisshoku Techno Fine Chemical Co., Ltd.
Zinc oxide: "Ginrei R" available from Toho Zinc Co., Ltd.
Barium sulfate: "Barium Sulfate BD" available from Sakai Chemical Industry Co., Ltd.
Diphenyl disulfide: available from Sumitomo Seika Chemicals Co., Ltd.
Dicumyl peroxide: "Percumyl (register trademark) D" available from NOF Corporation 2. Preparation of Intermediate Layer Composition and Cover Composition The materials having the formulations shown in Tables 2 and 3 were mixed with a twin-screw kneading extruder to prepare an intermediate layer composition and a cover composition in a pellet form. The extruding conditions of the intermediate layer composition and the cover composition were a screw diameter of 45 mm, a screw rotational speed of 200 rpm, and screw L/D=35, and the mixtures were heated to 160 to 230° C. at the die position of the extruder.

TABLE 2

| Intermediate layer composition | | |
|---|---|---|
| Formulation (parts by mass) | Surlyn 8945 | 55 |
| | Himilan AM7329 | 45 |
| | Titanium dioxide | 4 |
| Hardness (Shore D) | | 65 |

Surlyn (register trademark) 8945: sodium ion neutralized ethylene-methacrylic acid copolymer ionomer resin available from E.I. du Pont de Nemours and Company
Himilan (register trademark) AM7329: zinc ion neutralized ethylene-methacrylic acid copolymer ionomer resin available from Dow-Mitsui Polychemicals Co., Ltd.

TABLE 3

| Cover composition | | |
|---|---|---|
| Formulation (parts by mass) | Elastollan XNY82A | 100 |
| | TINUVIN 770 | 0.2 |
| | Titanium dioxide | 4 |
| | Ultramarine Blue | 0.04 |
| Hardness (Shore D) | | 29 |

Elastollan (register trademark) XNY82A: thermoplastic polyurethane elastomer available from BASF Japan Ltd
TINUVIN (register trademark) 770: hindered amine-based light stabilizer available from BASF Japan Ltd 3. Molding of Intermediate Layer The intermediate layer composition obtained above was directly injection molded on the spherical core obtained as described above to form the intermediate layer (thickness: 1.0 mm) covering the spherical core.

4. Preparation of Reinforcing Layer

A reinforcing layer composition (trade name "Polin (registered trademark) 750LE" available from Shinto Paint Co. Ltd.) having a two-component curing type epoxy resin as a base resin was prepared. The base material contains 30 parts by mass of a bisphenol A type solid epoxy resin and 70 parts by mass of a solvent. The curing agent contains 40 parts by mass of a modified polyamide amine, 5 parts by mass of titanium dioxide and 55 parts by mass of a solvent. The mass ratio of the base material to the curing agent was 1/1. The reinforcing layer composition was applied to the surface of the intermediate layer with an air gun and kept at an atmosphere of 23° C. for 12 hours, to form the reinforcing layer. The reinforcing layer had a thickness of 7 μm.

5. Molding of Cover

The cover composition in the pellet form was charged one by one into each of the depressed part of the lower mold of a half shell molding mold, and pressed to mold half shells. The spherical body having the reinforcing layer formed thereon was concentrically covered with two of the half shells. The spherical body and the half shells were charged into a final mold provided with a plurality of pimples on the cavity surface. Compression molding was conducted to mold the cover (thickness: 0.5 mm), and to obtain the golf ball bodies. A plurality of dimples having an inverted shape of the pimples were formed on the cover.

[Preparation of Paint]
1. Preparation of Polyol Composition

Polyoxytetramethylene glycol (PTMG, number average molecular weight: 650) and trimethylolpropane (TMP) were dissolved as the first polyol component in a solvent (toluene: methyl ethyl ketone=1:2 (mass ratio)) such that the first polyol component had a concentration of 50 mass % in the solvent. The molar ratio of TMP to PTMG (TMP:PTMG) was 1.8:1.0. Dibutyltin dilaurate was added as a catalyst into the above prepared solution in an amount of 0.1 mass % with respect to 100 mass % of the first polyol component. While keeping the temperature of the first polyol solution at a temperature of 80° C., isophorone diisocyanate (IPDI) was added dropwise as the first polyisocyanate component to the first polyol solution and mixed. The molar ratio (NCO/OH) of the NCO group included in the first polyisocyanate component to the OH group included in the first polyol component was 0.6.

After the dropwise addition of isophorone diisocyanate was finished, stirring was continued until the isocyanate group disappeared. Then, the reaction liquid was cooled to the normal temperature, and a solvent (toluene:methyl ethyl ketone=1:2 (mass ratio)) was added therein to prepare the polyol composition (solid component content: 30 mass %) containing urethane polyol. The urethane polyol contained in the polyol composition contained PTMG in an amount of 54 mass %, and had a hydroxyl value of 107.4 mgKOH/g and a weight average molecular weight of 7356.

TABLE 4

| Urethane polyol | | |
|---|---|---|
| Component | First polyol component | PTMG |
| | | TMP |
| | First polyisocyanate component | IPDI |
| Number average molecular weight of PTMG | | 650 |
| TMP:PTMG (molar ratio) | | 1.8:1.0 |
| Molar ratio of NCO group included in first polyisocyanate component to OH group included in first polyol component (NCO/OH) | | 0.6 |
| Amount of PTMG (mass %) | | 54.0 |
| Hydroxyl value of solid component (mgKOH/g) | | 107.4 |
| Weight average molecular weight | | 7356 |

2. Preparation of Polyisocyanate Composition

The polyisocyanate composition was prepared by mixing 30 mass parts of isocyanurate-modified product of hexamethylene diisocyanate (available from Asahi Kasei Chemicals Corporation, Duranate (register trademark) TKA-100 (NCO amount: 21.7 mass %)), 30 mass parts of biuret-modified product of hexamethylene diisocyanate (available from Asahi Kasei Chemicals Corporation, Duranate 21S-75E (NCO amount: 15.5 mass %)), and 40 mass parts of isocyanurate-modified product of isophorone diisocyanate (available from BAYER Corporation, Desmodur (register trademark) Z4470 (NCO amount: 11.9 mass %)). It is noted that a mixed solution of methyl ethyl ketone, n-butyl acetate and toluene was added as a solvent to adjust the concentration of the polyisocyanate component to 60 mass %.

3. Preparation of Paint

The polyol composition and the polyisocyanate composition prepared above were blended to prepare the paint. It is noted that the mixing ratio of the polyisocyanate composition to the polyol composition was adjusted such that the molar ratio (NCO/OH) of the NCO group included in the polyisocyanate composition to the OH group included in the polyol composition was 0.7.

[Formation of Paint Film]
1. Application of Paint

The surface of the golf ball bodies obtained above was treated with sandblast and marked. The paint was applied with a spray gun, and dried for 24 hours in an oven at a temperature of 40° C. to obtain golf balls having a diameter of 42.7 mm and a mass of 45.6 g. The thickness of the dried paint films was 10 μm.

The golf ball body was placed in a rotating member provided with a prong, the rotating member was allowed to rotate at 300 rpm, and application of the paint was conducted by spacing a spray distance (7 cm) between the air gun and the golf ball body while moving the air gun in an up and down direction. The painting interval in the overpainting operation was set to 1.0 second. Application of the paint was conducted under the air gun spraying conditions of overpainting: two times, a spraying air pressure: 0.15 MPa, a compressed air tank pressure: 0.10 MPa, a painting time for one application: 1 second, an atmosphere temperature: 20° C. to 27° C., and an atmosphere humidity: 65% or less.

2. Graft Polymerization

The initiator solution (initiator concentration: 50 g/L) was prepared by dissolving 5 g of benzophenone in 0.1 L of acetone. The golf ball having the paint film formed thereon was immersed in the initiator solution (23° C.) for 10 minutes. The golf ball was taken out and allowed to stand still for 1 hour to 2 hours, and acetone was removed to obtain the golf ball provided with the initiator.

Next, the monomer aqueous solution (monomer concentration: 0.2 mol/L) was prepared by dissolving 8.9 g (0.07 mole) of N-isopropylacrylamide in 0.35 L of water. The monomer aqueous solution (23° C.) was placed in a glass container, and the golf ball provided with the initiator was immersed therein. The monomer aqueous solution was bubbled with inert gas to remove dissolved oxygen, and then the container was shut tightly. Subsequently, an ultraviolet ray irradiator (illuminance: 19.5 mW/cm$^2$) was used to irradiate the golf ball from the outside of the glass container for 360 minutes with ultraviolet ray to perform the polymerization. After the polymerization reaction, the golf ball was taken out and washed with water.

[Evaluation]

The evaluation of the golf ball was conducted using a urethane sheet formed from the same paint as the outermost paint film layer, a grafted urethane sheet (PNIPAM-grafted urethane sheet) obtained by graft polymerization of N-isopropylacrylamide to the urethane sheet similarly as the outermost paint film layer, and a grafted urethane sheet (acrylic acid-grafted urethane sheet) obtained by graft polymerization of acrylic acid to the urethane sheet.

(Urethane Sheet)

The paint prepared above was applied in an amount of 20 g to a polytetrafluoroethylene sheet, and a film coater (available from Hanchen Corporation, ZH-747-A) was used to form a urethane paint film in a thickness of 200 µm. The sheet was allowed to stand still at room temperature (23° C.) for 24 hours, and then stored in a vacuum oven of 40° C. for 24 hours to cure the urethane paint film. The cured urethane paint film was peeled off from the sheet to obtain the urethane sheet.

(PNIPAM-Grafted Urethane Sheet)

The urethane sheet prepared above was immersed in 100 mL of the initiator solution (solvent:acetone, initiator:benzophenone, initiator concentration: 50 g/L, solution temperature: 23° C.) for 10 minutes. Then, the urethane sheet was taken out and allowed to stand still for 1 to 2 hours, and acetone was removed to provide the urethane sheet with the initiator.

Next, 100 mL of the monomer aqueous solution (solvent: water, monomer: N-isopropylacrylamide, monomer concentration: 0.2 mol/L, solution temperature: 23° C.) was placed in a glass container, and the urethane sheet provided with the initiator was immersed therein. The monomer aqueous solution was bubbled with inert gas to remove dissolved oxygen, and then the container was shut tightly.

Subsequently, an ultraviolet ray irradiator (illuminance: 19.5 mW/cm$^2$) was used to irradiate the urethane sheet from the outside of the glass container for 360 minutes with ultraviolet ray to perform the polymerization. After the polymerization reaction, the grafted urethane sheet was taken out and washed with water to obtain the test piece.

It is noted that the grafted urethane sheet is a sheet where 0.272 g of the urethane sheet was provided with 0.076 g of poly(N-isopropylacrylamide) graft chain. The poly(N-isopropylacrylamide) chain has a cloud point of 32° C.

(Acrylic Acid-Grafted Urethane Sheet)

The urethane sheet prepared above was immersed in 100 mL of the initiator solution (solvent: acetone, initiator: benzophenone, initiator concentration: 50 g/L, solution temperature: 23° C.) for 10 minutes. Then, the urethane sheet was taken out and allowed to stand still for 1 to 2 hours, and acetone was removed to provide the urethane sheet with the initiator.

Next, 100 mL of the monomer aqueous solution (solvent: water, monomer: acrylic acid, monomer concentration: 0.2 mol/L, solution temperature: 23° C.) was placed in a glass container, and the urethane sheet provided with the initiator was immersed therein. The monomer aqueous solution was bubbled with inert gas to remove dissolved oxygen, and then the container was shut tightly.

Subsequently, an ultraviolet ray irradiator (illuminance: 19.5 mW/cm$^2$) was used to irradiate the urethane sheet from the outside of the glass container for 360 minutes with ultraviolet ray to perform the polymerization. After the polymerization reaction, the grafted urethane sheet was taken out and washed with water to obtain the test piece.

It is noted that the grafted urethane sheet is a sheet where 0.282 g of the urethane sheet was provided with 0.453 g of polyacrylic acid graft chain. The polyacrylic acid chain has no temperature responsiveness.

[Oily Stain Washing Test]

The test piece was immersed in canola oil for 10 minutes. The test piece taken out from the canola oil was immersed in water (23° C.) or warm water (40° C.), and jiggled in the water. After that, the test piece was allowed to stand still. Floating or sinking of the test piece was observed, and evaluated according to the following standard.

E (Excellent): The test piece sunk in less than 10 seconds from the standing still.

G (Good): The test piece sunk in 10 seconds or longer from the standing still.

P (Poor): The test piece floated on the water surface.

[Weed Juice Stain Resistance Test]

Weed juice was prepared by mixing 100 g of spinach and 500 mL of water in a mixer. 100 mL of weed juice was placed in a glass container, the test piece was added therein, and the glass container was allowed to stand still for at least 48 hours. It is noted that the atmosphere temperature at which the glass container having the test piece added was allowed to stand still was a room temperature (23° C.) or a high temperature (in an oven, 45° C.). After the standing still, the test piece was taken out. The stained state of the test piece was confirmed by naked eyes, and evaluated according to the following standard.

G (Good): The test piece nearly had the same color as that before being added in the weed juice, or stained to a slight yellow color.

P (Poor): The test piece was stained to a green or dark brown color.

[Water Contact Angle]

A hot plate (available from MSA-factory Co., ltd., PH200-100-PCC10A) was placed on the stage of a contact angle detector (available from KYOWA Corporation, DM-501), and the sample was sticked on the hot plate with a double-sided adhesive tape to measure the contact angle. The temperature conditions were 23° C. and 45° C. The water droplet amount was 2.0 μL. The contact angle was measured in 30500 msec. later after the water droplet was dropped.

TABLE 5

|  |  | Urethane sheet | PNIPAM-grafted urethane sheet | Acrylic acid-grafted urethane sheet |
|---|---|---|---|---|
| Base resin | | Urethane resin | Urethane resin | Urethane resin |
| Graft chain | | — | Poly(N-isopropyl-acrylamide) chain | Poly(acrylic acid) chain |
| Cloud point of graft chain (° C.) | | — | 32 | — |
| Oily stain washability | Water (23 ° C.) | P | E | G |
| | Warm water (40° C.) | P | G | G |
| Weed juice stain resistant effect | Room temperature (23° C.) | P | G | P |
| | High temperature (45° C.) | P | P | P |
| Water contact angle (°) | Room temperature (23° C.) | 71.4 | 34.9 | 32.2 |
| | High temperature (45° C.) | 67.9 | 74.3 | 43.7 |

The urethane sheet (without graft chain) floated on the surface of both water (23° C.) and warm water (40° C.) in the oily stain washing test. This is because the canola oil impregnated in the urethane sheet was not released. In other words, the urethane sheet had poor oily stain washability in both water (23° C.) and warm water (40° C.). In addition, the urethane sheet was stained at both room atmosphere (23° C.) and high temperature atmosphere (45° C.) in the weed juice stain resistance test, and thus had poor weed juice stain resistance.

Compared to this, the grafted urethane sheet having incorporated poly(N-isopropylacrylamide) chain with temperature responsiveness as the graft chain sunk into both water (23° C.) and warm water (40° C.). This is because the canola oil impregnated in the grafted urethane sheet was released. Thus, the grafted urethane sheet had excellent oily stain washability in both water (23° C.) and warm water (40° C.). In addition, the grafted urethane sheet was not stained at room temperature atmosphere (23° C.) even though it was stained at high temperature atmosphere (45° C.) in the weed juice stain resistance test. Based on these results, it is considered that incorporation of the graft chain having temperature responsiveness to the base resin constituting the outermost paint film layer allows the oily stain or weed juice stain adhered to the golf ball to be easily washed away with water at a low temperature (a temperature of the cloud point of the graft chain or lower).

The grafted urethane sheet having incorporated acrylic acid chain as the graft chain sunk into both water (23° C.) and warm water (40° C.) in the oily stain washing test, and thus has better oily stain washability than the urethane sheet. However, the grafted urethane sheet having the introduced acrylic acid chain was stained at both room atmosphere (23° C.) and high temperature atmosphere (45° C.) in the weed juice stain resistance test, and thus had poor weed juice stain resistance.

This application is based on Japanese patent application No. 2020-152659 filed on Sep. 11, 2020, the contents of which are hereby incorporated by reference.

The invention claimed is:

1. A golf ball comprising a golf ball body and a paint film composed of at least one layer and covering the golf ball body, wherein
   a molecular chain of a base resin constituting an outermost layer located at an outermost side of the paint film has a graft chain, and
   80 mole % or more of repeating units constituting the graft chain includes any one of repeating units represented by formulae (1) to (4):

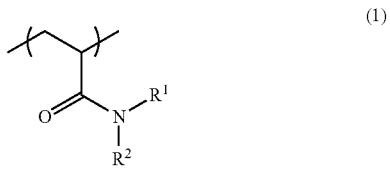

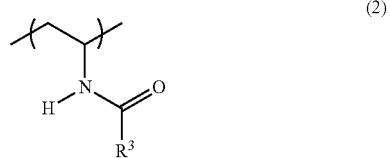

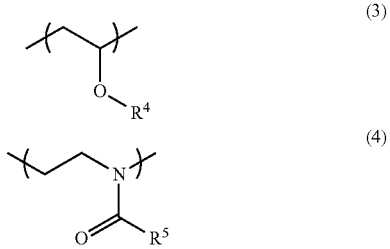

in the formulae (1) to (4), $R^1$ to $R^5$ each independently represent hydrogen, halogen or an organic group.

2. The golf ball according to claim 1, wherein the graft chain has a cloud point ranging from 0° C. to 50° C.

3. The golf ball according to claim 1, wherein a surface of the outermost paint film layer has a water contact angle of 50° or less at a temperature lower than a cloud point of the graft chain.

4. The golf ball according to claim 1, wherein the base resin constituting the outermost paint film layer contains at least one member selected from the group consisting of a urethane resin, an ionomer resin, an epoxy resin, an acrylic resin, a vinyl acetate resin and a polyester resin.

5. The golf ball according to claim 1, wherein the repeating unit represented by the formula (1) includes any one of repeating units represented by formulae (1-1) to (1-8):

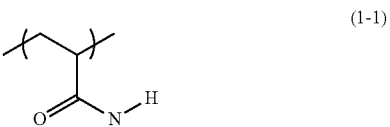

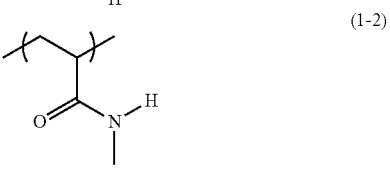

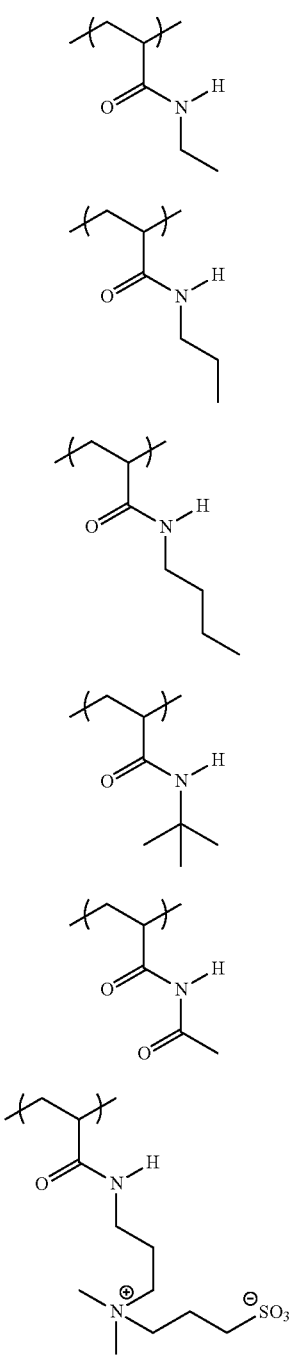
(1-3)
(1-4)
(1-5)
(1-6)
(1-7)
(1-8)
the repeating unit represented by the formula (2) includes any one of repeating units represented by formulae (2-1) to (2-6):
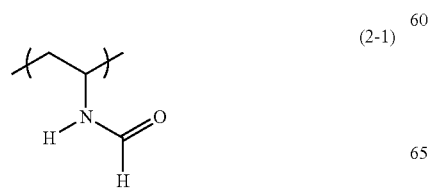
(2-1)
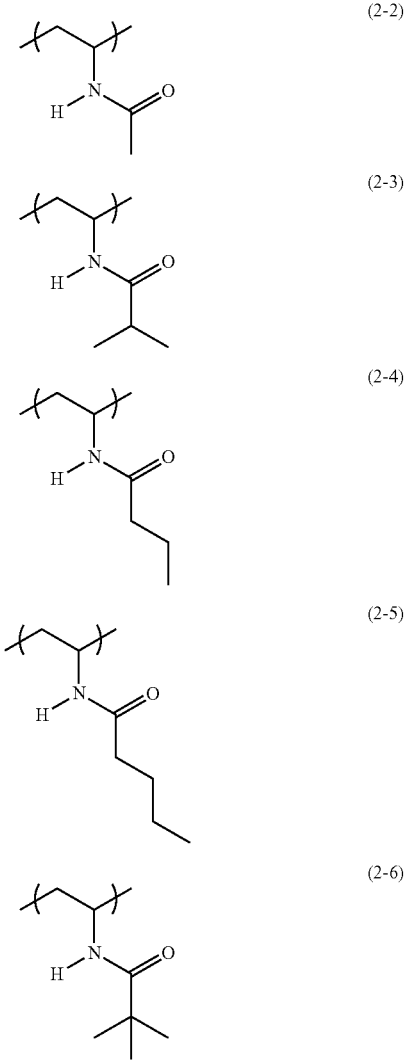
(2-2)
(2-3)
(2-4)
(2-5)
(2-6)
the repeating unit represented by the formula (3) includes any one of repeating units represented by formulae (3-1) to (3-6):
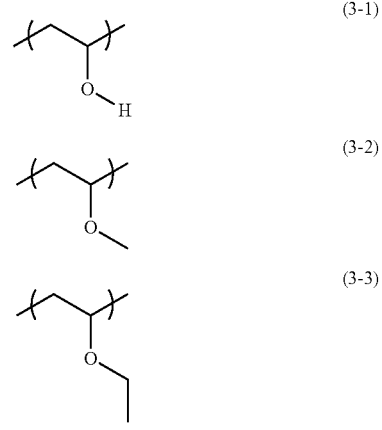
(3-1)
(3-2)
(3-3)

(3-4)
(3-5)
(3-6)

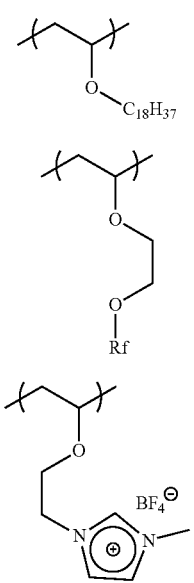

and the repeating unit represented by the formula (4) includes any one of repeating units represented by formulae (4-1) to (4-3):

(4-1)
(4-2)
(4-3)

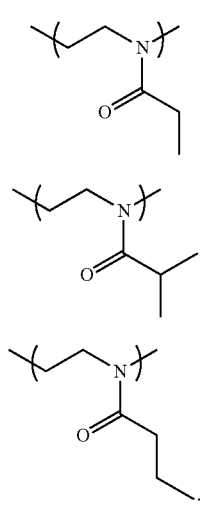

6. The golf ball according to claim 1, wherein the graft chain is a homopolymer chain.

7. The golf ball according to claim 1, wherein the graft chain includes a poly(N-isopropylacrylamide) chain, a poly(N-n-propylacrylamide) chain, a poly(N-n-butylacrylamide) chain, or a poly(N-t-butylacrylamide) chain.

8. The golf ball according to claim 1, wherein an amount of the graft chain ranges from 0.001 g to 2 g per a golf ball.

9. The golf ball according to claim 1, wherein the paint film is formed from a paint containing a polyol composition and a polyisocyanate composition.

10. The golf ball according to claim 9, wherein the polyol composition contains a urethane polyol, and the urethane polyol includes a polyether diol having a number average molecular weight ranging from 600 to 3000 as a constituent component.

11. The golf ball according to claim 10, wherein the polyisocyanate composition contains at least one member selected from the group consisting of a biuret-modified product of hexamethylene diisocyanate, an isocyanurate-modified product of hexamethylene diisocyanate, and an isocyanurate-modified product of isophorone diisocyanate.

12. The golf ball according to claim 9, wherein the polyol composition contains a polyrotaxane having a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—C$_3$H$_6$—O— group.

13. The golf ball according to claim 12, wherein the polyol composition optionally further contains a polycaprolactone polyol, and a mass ratio (polycaprolactone polyol/polyrotaxane) of the polycaprolactone polyol to the polyrotaxane ranges from 0/100 to 90/10.

14. The golf ball according to claim 12, wherein the polyol composition further contains a hydroxy group modified vinyl chloride-vinyl acetate copolymer in an amount ranging from 4 mass % to 50 mass %.

15. The golf ball according to claim 12, wherein the polyisocyanate composition contains an isocyanurate-modified product of hexamethylene diisocyanate and/or a biuret-modified product of hexamethylene diisocyanate.

\* \* \* \* \*